United States Patent [19]

Shah

[11] 4,028,779

[45] June 14, 1977

[54] FILM GRANULATOR

[75] Inventor: Sunil C. Shah, Cranston, R.I.

[73] Assignee: Leesona Corporation, Warwick, R.I.

[22] Filed: Dec. 17, 1975

[21] Appl. No.: 641,827

[52] U.S. Cl. .................................. 241/73; 226/5; 241/222

[51] Int. Cl.² ........................................ B02C 18/22

[58] Field of Search ............ 241/73, 167, 222, 224, 241/225, 243; 226/5

[56] References Cited

UNITED STATES PATENTS

| 1,826,891 | 10/1931 | Krogan | 241/225 |
| 2,830,770 | 4/1958 | De Luca | 241/73 |
| 3,353,754 | 11/1967 | Heijnis et al. | 241/243 X |
| 3,357,467 | 12/1967 | Morkosiki | 241/222 X |
| 3,545,686 | 12/1970 | Brown | 241/243 X |
| 3,790,093 | 2/1974 | McIntyre | 241/73 |
| 3,817,464 | 6/1974 | Sousek | 241/222 |

Primary Examiner—Roy Lake
Assistant Examiner—Howard N. Goldberg

Attorney, Agent, or Firm—Robert J. Doherty

[57] ABSTRACT

The present disclosure relates to a size reduction apparatus such as a granulator and particularly to a novel feed assembly for such a granulator whereby thin plastic sheet material may be successfully granulated at high through-put speeds. The construction includes the use of a closed chamber mounted above the granulator chamber and having a longitudinally orientated feed slot therein, directly above which a pair of nip rolls are mounted so as to enable sheet material to be fed directly into the chamber of the granulating machine towards the rotor and in a generally radial direction thereto. The device is operated while the chamber thereof is at least partly full of partially granulated material. A baffle extending from the upstroke side of such slot is positioned so as to downwardly extend into the chamber and approaching the rotor thereof so as to deflect partially granulated material carried by the rotational movement of the rotor from contacting the newly entering sheet material so as to prevent deflection thereof away from the rotor.

9 Claims, 3 Drawing Figures

FILM GRANULATOR

BACKGROUND OF THE INVENTION

It is highly desirable to be able to process waste or off-specification thin sheet material and to accomplish such at high rates of speed. A re-occurrent problem in attempting to accomplish the granulation of such materials, for example ½ mil polyethylene film, has been the tendency of this material to produce undesirable accordian-like folds or pleats when fed to the granulation chamber of a size reduction device type having a chamber and rotating rotor mounted therein in turn having knives fixed thereto for cooperating cutting relationship with stationary bed knives positioned at least on the downstroke side of the chamber. Various attempts to increase the granulation rate of such material such as the inclusion of further knife surfaces both of the rotating and fixed bed types, the increase in the rotor speed rates etc. have not met with the desired results inasmuch as the tendency of such material to accordian fold prevents sheet material from being consistently grasped by and fed into the rotor so as to enable such high throughput rates desired to be achieved. For instance, the material has been roped, that is, spirally wound prior to being fed to the chamber; but such has also not met with the desired results. It would accordingly be useful to provide a device which successfully enables the granulation of thin flexible film at high throughput rates while preventing such undesirable accordian fold tendencies.

Accordingly the principal object of the present invention is the provision of a granulator construction which will granulate thin flexible film material at high rates of speed and which is not limited by the inability of such device to receive sheet material to be processed.

A further object of the present invention is the provision of a granulator construction which enables the feeding of thin sheet material thereto in such a manner that undesirable accordian pleating is avoided.

These and other objects of the invention are acomplished by the provision of a granulator having a closed chamber in which a rotor having a plurality of knives adapted for cooperative cutting relationship with a stationary knife or knives is mounted for rotation along a longitudinal axis thereof and wherein a pair of feed rolls are mounted directly above said chamber so as to enable feeding of sheet material directly towards said rotor in a generally radial direction thereto and wherein previously partially granulated material carried by the rotation of said rotor is deflected by a baffle downwardly projecting into the chamber towards said rotor but spaced therefrom.

Other objects and features of the invention will become more apparent with reference to the following drawings and the detailed description of the invention.

DESCRIPTION OF THE INVENTION

Figures 1, 2, 3:
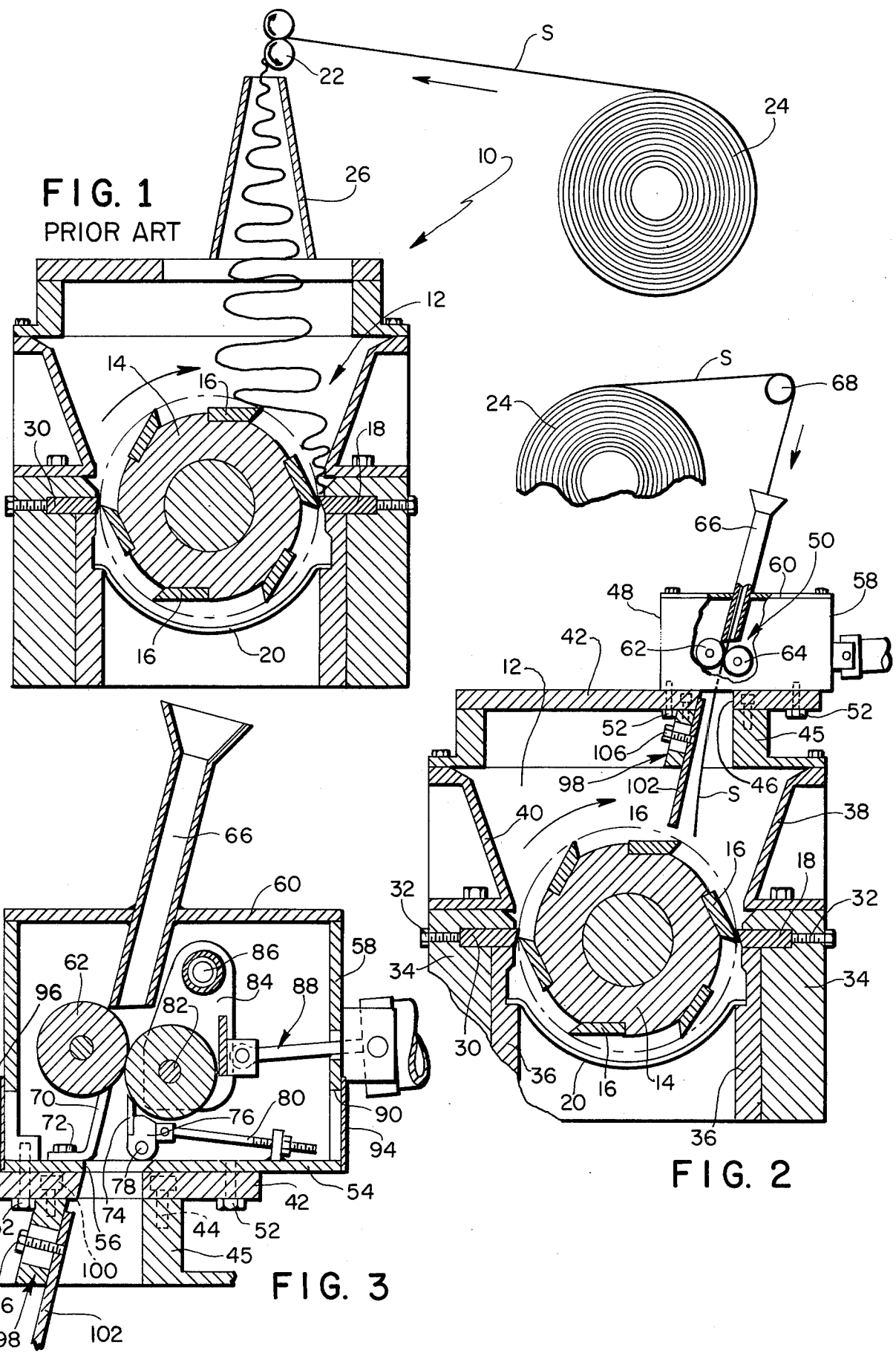
FIG. 1 is an overall partially schematic representation of a prior art granulation device and feed mechanisms therefor which exhibit undesirable accordian pleating of thin flexible sheet material.
FIG. 2 is an overall side sectional and partially schematic view of the granulator device of the present invention.
FIG. 3 is an enlarged sectional view of the feed portion thereof.

The prior art representation depicted in FIG. 1 of the drawings shows a granulator 10 of the type having a chamber 12 in which a rotor 14 having a plurality of knives 16 outwardly projecting from the periphery thereof is axially mounted therein. The rotor 14 is adapted for rotation in the direction of the arrow wherein the knives 16 are positioned for cooperating cutting relationship with one or more fixed position bed knives 18. The lower part of the chamber 12 includes a screen 20 having openings of a predetermined size so that material fed to the chamber 12 and comminuted by the cooperating action of the knives 16 and 18 will, once having been reduced to such predetermined size, pass through the openings therein and accordingly be discharged from the chamber for further processing. The particular granulator depicted includes a conventional feed roll set 22 which takes sheet material S from a roll stand or holding station 24 for feed towards the granulator 10. Such prior art device results in and exhibits the undesirable effect of accordian pleats formed within housing 26 when high throughput rates are attempted and when the chamber 12 is full of partially granulated material. Such action prevents sheet material S from being positively grasped by the rotor 14 and fed into the cutting nip positioned at the downstroke bed knife 18. This is caused either by the presentation of the material S in a more planar configuration to the rotor in turn brought about by the pleating action or by the swirl of partially comminuted material being directed thereagainst by the action of the rotor. In other words, flat or folded portions of the sheet, rather than its leading edge, are presented to the rotor which instead of grasping such and forcing it into the bed knife for cooperative cutting action with the present rotor knives may, on occasion fail to grasp or slap away the sheet, thus causing such to bunch up in the chamber without being cut in the intended manner.

Referring now to FIG. 2 of the drawings, the construction of the granulator 10 of the present invention is depicted as similar in construction to that depicted in FIG. 1 of the drawings with the exception of the feed system. This granulator may be the same as manufactured and sold by Cumberland Engineering Company, Inc, P.O. Box 6065, Providence, R.I. 02904, as a modified hog-type granulating machine. In such granulator 10, it is desirable to provide a great many cutting surfaces and accordingly the rotor 14 thereof is provided with a plurality of knives 16 e.g. six, eight etc. positioned generally equidistantly about the periphery of the rotor. Each knife is also preferably provided with a straight continuous blade configuration, that is, a blade which is continuous along the axial or longitudinally extent of the rotor. Such blade and rotor configuration accordingly permits a high number of cuts to be effected when the rotor is rotated at a high rate of speed.

In addition to the downstroke bed knife 18, at least one upstroke bed knife 30 is provided. Both bed knives 18 and 30 are inwardly adjustable by screw mechanisms 32 and as shown are mounted, as are the bed knives, in a side wall 34 portion of the machine frame 36. A downstroke access door 38 and an upstroke door 40 are positioned above side wall portions 34 and are mounted for relative pivotable movement away from the chamber 12 so to provide access thereto. As previously indicated a screen 20 having openings of a predetermined diameter is provided on the bottom portion of the chamber 12 between the frame member 36 so as to close the bottom of the chamber 12 and to permit material having been reduced in size to pass readily therethrough. The top of the chamber is enclosed by a top wall 42 mounted directly as by bolts 44 to an upstanding ledge 45. The wall 42 is provided with a slot 46 longitudinally disposed therein on the downstroke side of the chamber 12. An enclosure 48 serves to enclose the feed assembly 50. Such enclosure 48 is attached to the top wall 42 by bolts 52 or other conventional means.

Turning now to FIG. 3 of the drawings, the enclosure includes a bottom wall 54 having a longitudinally directed slot or opening 56 coinciding the extent of slot 46 in the top wall 42 of the chamber 12 and upwardly directed side walls 58 and a top wall 60. A pair of nip rolls 62 and 64 are mounted for axial disposition within the enclosure 46. Roll 62 disposed closer to the upstroke side of the rotor 14 is upwardly displaced from the roll 64. The drive roll 62 is fixed in its axial position while the driven roll 64 is pivotal movable towards and away therefrom so as to accommodate various thicknesses of sheet material fed therein. The top wall 60 of the enclosure 48 is provided with an opening in which a safety shute 66 is fitted so as to prevent accidental access to the feed assembly 50. The disposition of such shute 66 is generally parallel to a plane passing perpendicular or normal to a plane passing through the respective axes of the rolls 62 and 64 so as to better preorientate the sheet material in that direction in which it will be forcibly moved into the chamber 12 prior to its entry to the nip of rolls 62 and 64. Additionally and for this above purpose, a guide roll 68 is positioned in line with such angular position of the entry tube 66 and spaced therefrom. Such preorientation enables inner radial puckering or other curling tendencies of the sheet material while changing directions as is normally required in feeding granulator devices as by passage over a guide roll such as 68, to be normalized prior to entry into the nip of the feed rolls 62 and 64. Such preorientation reduces the tendencies for sheet material to continue to curl and form undesirable wraps around either of the feed roll 62 and 64. To further prevent such potential for wrapping, a stripper 70 is mounted to the bottom wall 54 of enclosure 48 by means of bolts 72 and positioned to engage or be in close proximity to the fixed position roll 62. A similar stripper 74 is positioned in close proximity to the movable roll 64 and is mounted upon a plate 76 pivotable about a rod 78 and actuated by arm 80 having adjustable means (not shown) so as to follow the pivotal movement of the roll 64 to the right as viewed in FIG. 3 to accommodate various sheet material thicknesses.

The roll 64 is mounted upon a shaft 82 which is supported from end plates 84, one of which is shown. The plates 84 are in turn supported on shaft 86 and accordingly arcuately pivotal therearound to the extent permitted by an adjustment mechanism 88 which controls the positioning thereof. Access to the adjacent rod 80 and the strippers 70, 74 is had through openings 90 and 92 respectively in the side walls 58 of the enclosure and covered by means of panels 94 and 96 respectively.

Extending below the bottom wall 54 of the enclosure 48 is a baffle 98. Such baffle is affixed to the enclosure by means of a bolt 100 and extends inwardly to the chamber 12 at an angle generally parallel to that aforementioned plane normal to that plane passing through the feed roll centers and accordingly serves as a continuation of the orientation means for the sheet material S. Such orientation assures that as it is fed from the feed roll 62 and 64, it moves toward the rotor 14 in a generally radial direction so that the knives 16 thereof can engage and catch such material prior to its entry to the cooperating cutting region defined by the position of the downstroke bed knife 18 and thus assured of continual feed there into at a high rate. The baffle 98 includes a variable portion 102 thereof which is slidable within a slot (not shown) formed in the face portion thereof positioning thereof being adjustable by means of bolt 106. The baffle 98 or at least the adjustable portion 102 thereof, may thus be moved towards and away from the rotor 14. In this way then the partially comminuted material within the chamber 12 which is normally swirled about in the clockwise direction depicted by the rotational action of the rotor 14 is to a great extent deflected and thus better enables the sheet material being fed thereinto to move directly towards the rotor. The baffle is believed to prevent such material streaming from across the peripheral surface of the rotor 14 and contacting the newly entering sheet material so as to deflect such from the rotor in as much as in the absence thereof incidents of accordian-pleating occur.

It is thus apparent that the present device can in the manner of operation indicated provide the high speed size reduction of flexible sheet material without the undesirable incidents of accordian-pleating. It should be understood that variations and modifications and special adaptions of the embodiments of the present invention may be utilized without departing from the scope thereof as set forth by the following claims.

I claim:
1. In combination with a granulator for size reduction of material, a feeding device for feeding sheet material thereto, said granulator including a chamber, a rotor mounted for rotation about an axis within said chamber, cutting means affixed on said rotor, bed knife means mounted for projection into said chamber at least on the downstroke side thereof for cooperative cutting relationship with said cutting means as said rotor is driven, screen means forming a lower portion of the boundary of said chamber whereby material reduced in size by said cooperative cutting relationship passes through said screen and is discharged from said chamber, said chamber being closed except for a narrow slot in the top thereof, said slot extending longitudinally along said axis and opening into said chamber on the downstroke side of said rotor, means adapted to positively drive sheet material directly into said chamber generally radially towards said rotor, including a longitudinally orientated baffle downwardly extending into said chamber from said chamber top, said baffle positioned proximate said slot and on the upstroke side thereof, said baffle approaching said rotor but spaced therefrom.

2. The construction set forth in claim 1, said means adapted to positively drive sheet material directly into said chamber comprising a pair of nip rolls mounted directly above said slot, said feed direction being substantially normal to a plane passing through the center lines of said nip rolls.

3. The construction set forth in claim 2, one of said nip rolls positioned on the upstroke side of said slot and the other roll positioned on the downstroke side thereof, said one roll upwardly displaced from said other roll.

4. The construction set forth in claim 3, including means spaced above said pair of nip rolls for preorientating said sheet material prior to contact with said rolls in a direction generally parallel to said feed direction.

5. The construction set forth in claim 4, said preorientating means comprising a guide roll.

6. The construction set forth in claim 5, said nip rolls further separately enclosed to prevent access thereto, an access tube projecting from said enclosure for accommodating sheet material directed to said nip rolls, said tube, and said baffle generally parallel to said plane normal to that plane passing through the center lines of said nip rolls.

7. The construction set forth in claim 2, each of said nip rolls having a stripper associated therewith for preventing accidental wrapping of said sheet material therearound.

8. The construction set forth in claim 1, said baffle radially adjustable towards and away from said rotor.

9. The construction set forth in claim 2, one of said nip rolls positioned on the upstroke side of said slot and the other roll positioned on the downstroke side thereof, said one roll upwardly displaced from said other roll.

* * * * *